United States Patent [19]
Borca et al.

[11] 4,239,416
[45] Dec. 16, 1980

[54] LINED CAVITY IN THE EARTH

[75] Inventors: Bruno Borca; Emilio Ruscelli, both of Milan, Italy

[73] Assignee: Pirelli Furlanis Applicazioni Indrauliche, Milan, Italy

[21] Appl. No.: 942,592

[22] Filed: Sep. 15, 1978

[30] Foreign Application Priority Data

Sep. 19, 1977 [IT] Italy .............................. 27658 A/77

[51] Int. Cl.³ ............................................. B65G 5/00
[52] U.S. Cl. ..................................... 405/53; 220/403; 220/461; 405/55
[58] Field of Search .................................. 405/55–59, 405/150, 53; 52/169.7, 169.14, 169.6; 220/236, 237, 403, 461, 901; 114/74 R, 74 A

[56] References Cited

U.S. PATENT DOCUMENTS

| 2,361,743 | 10/1944 | Butler | 220/461 X |
|---|---|---|---|
| 2,372,187 | 3/1945 | Davison | 52/169.14 X |
| 2,413,243 | 12/1946 | Neff | 52/169.14 X |
| 2,508,906 | 5/1950 | Cunningham et al. | 220/403 |
| 3,068,561 | 12/1962 | Jones | 405/53 UX |
| 3,562,987 | 2/1971 | Eakin | 405/55 X |

FOREIGN PATENT DOCUMENTS

| 2325496 | 3/1974 | Fed. Rep. of Germany | 405/150 |
|---|---|---|---|
| 2300648 | 7/1974 | Fed. Rep. of Germany | 405/150 |
| 2305904 | 8/1974 | Fed. Rep. of Germany | 405/150 |
| 2532664 | 1/1977 | Fed. Rep. of Germany | 405/150 |
| 2054375 | 4/1971 | France | 405/150 |
| 494382 | 10/1938 | United Kingdom | 52/169.6 |

*Primary Examiner*—Dennis L. Taylor
*Attorney, Agent, or Firm*—Stevens, Davis, Miller & Mosher

[57] ABSTRACT

A cavity in the earth such as a reservoir, tunnel or the like is lined with a flexible, fluid impervious sheet such as a rubberized fabric supported by a grid-like skeleton structure having distorted elongated resilient structural members which are under tension and press the liner against the walls of the cavity. The members of the skeleton structure are made of a material which resists permanent distortion. The liner is disposed between the skeleton structures and the wall of the cavity and is fastened at spaced points to the wall of the cavity.

19 Claims, 3 Drawing Figures

LINED CAVITY IN THE EARTH

This invention relates to a means for supporting an impermeable flexible liner against the walls of a cavity in the earth and, more particularly, to a method for installing a liner against the walls of a cavity such as a cavern in rock used as a reservoir for collecting water or other fluid, against the walls of a concrete tank or the like for storing drinking water, or against the walls of a tunnel or a similar excavation and to the lined cavity.

In general, the invention can be practiced for lining any naturally occurring or engineered cavity in the earth with a fluid impermeable flexible liner, e.g., a sheet of rubberized fabric, in order to protect the inside of the cavity from the infiltration of foreign substances, particularly contaminating substances in the case of a tank containing drinking water or other liquid.

Such impermeable flexible liners may be disposed over the walls and bonded thereto with a suitable adhesive substance. However, such a process is extremely expensive. It is necessary, for example, to make the sidewalls and roof about a cavity in rock perfectly smooth in order to insure that the liner is adhesively bonded to the rock. Sometime such walls may be extremely long of up to 60-70 or more meters.

Obviously, this preliminary smoothing operation and installation of the liner has the disadvantage of excessive cost. In addition, such a method creates many technical problems. For example, an adhesively bonded liner on the walls of a water reservoir may become detached from the wall leaving a void between the liner and wall. This void will gradually increase in volume with the liner becoming completely detached from the wall.

Another method of fastening an impermeable flexible liner to the walls of a cavity in the earth involves making a framework of metal tubes and arranging the tubes inside the cavity around the inside surface of the liner, or in the case of a cavern, providing a frame which rests on the floor and which extends as far as the roof of the cavern, in contact with the sidewalls.

However, this method, apart from the disadvantage of high cost of equipment required for making the installation, has the further disadvantage that the frame rests on the floor of the cavity and reduces the available volume of the cavity. The installation also requires frequent maintenance.

It is an object of this invention to provide excavations in the earth having their walls lined with an impermeable flexible sheet material attached to the walls of the excavation which is devoid of the foregoing disadvantages. Another object of the invention is to provide a method for supporting a sheet-like, fluid impermeable liner against the walls of an excavation or other cavity in the earth.

Other objects will become apparent from the following description with reference to the accompanying drawing wherein.

Figure 1:
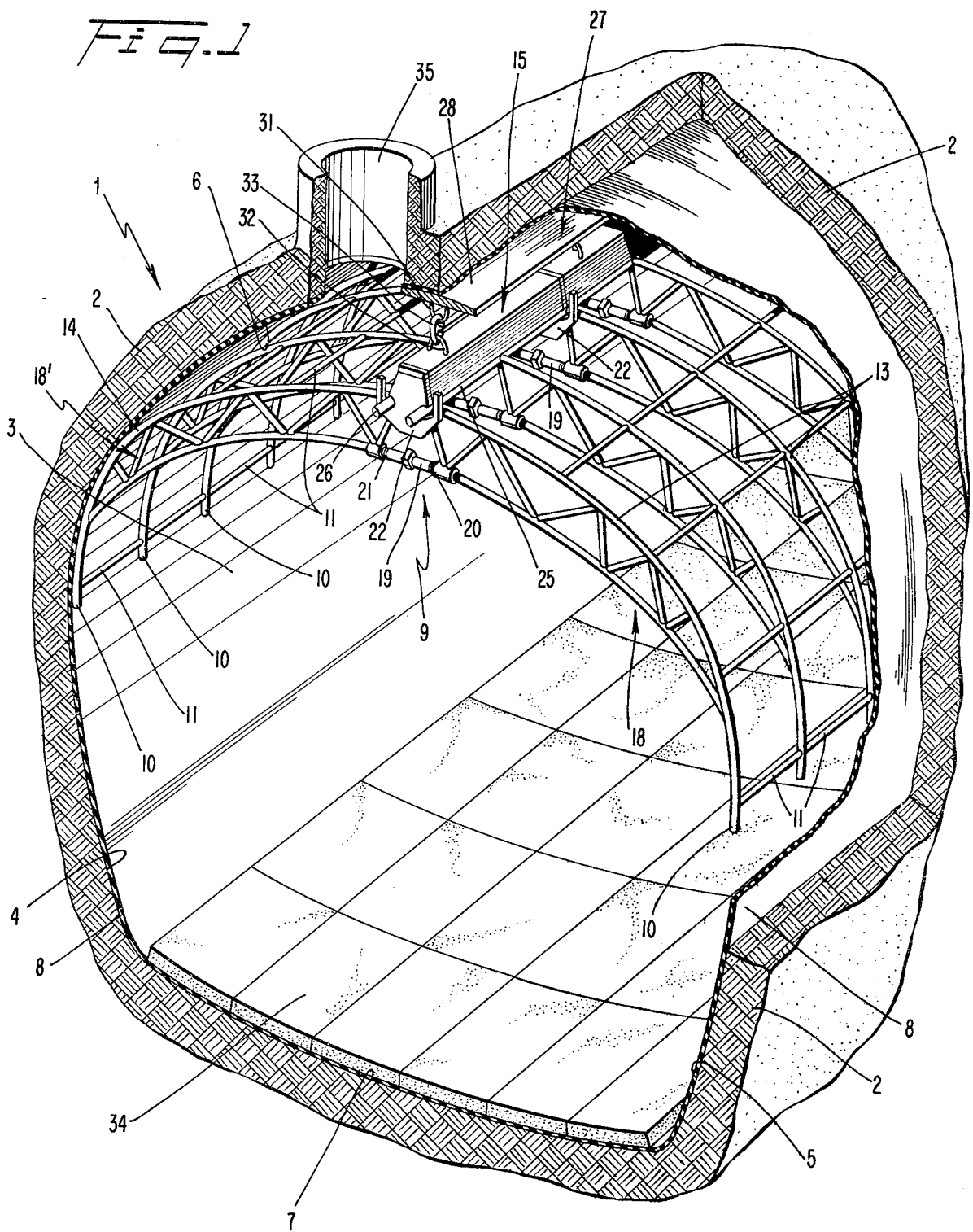
FIG. 1 is a perspective view of a cavity lined with a substantially fluid impervious sheet-like member in accordance with one embodiment of the invention.

The foregoing objects and others are accomplished in accordance with this invention, generally speaking, by providing a resistant structure for supporting an impermeable sheet-like liner against the walls of a cavity in the earth. The supporting structure may be a skeleton frame having a lattice-type structure of spaced generally vertically disposed rods or the like and crossing girders with the vertically disposed rods sprung into a curved contour between opposite walls of the cavity and pressing the frame and underlying liner against the walls of the cavity. The supporting structure is attached at spaced points to the walls of the cavity with novel fasteners. The rods are of a resilient material such as a fiberglass reinforced plastic or polymer or metal such as iron, steel, spring steel, or the like which are distorted from their normal contour and are restrained from reassuming their normal contour.

In accordance with one embodiment, an excavation or man-made cavity in the earth is lined with an impermeable sheet and is supported by a net-work of structural steel members which resist bending or deformation and are thus under tension because they are bent and restrained to conform to the contour of the roof and opposite wall of the cavity. The structural members press the impermeable flexible layer against the walls of the cavity with continuity, by exerting forces sufficient to keep the members attached to parts of the cavity.

The fundamental characteristic of the supporting structure is that it is under tension because the vertical members are distorted from their normal contour and held from returning to the normal contour because they are sprung between the walls of the cavity.

The resilient flexible members are deformed because of the curvature of the sidewalls and exert forces, the effect of which is to stretch, with continuity, the impermeable flexible liner against the walls of the cavity.

Therefore, the impermeable flexible liner tends to be uniformly disposed over the wall, advantageously occupying any empty space or depression present in the wall.

The resilient structural members are especially advantageous in lining cavities of great length and with large cross-sections of several meters, for example.

Preferably, the excavations are characterized by the fact that the said structural members resist distortion and have a plurality of iron sections arranged at intervals along planes transverse of the longitudinal axis of the cavity.

In this case, in a tunnel, for example, the sections, the form of which can be defined by a rectilinear or slightly curvilinear axis are originally longer than the maximum distance between the opposite sidewalls of the tunnel.

When the sections are installed inside the tunnel, the ends are moved closer together because the maximum transverse distance between the sidewalls is less than the length of the section.

Consequently, the section undergoes elastic deformation and assumes a substantially curvilinear form which is convex in the direction of the tunnel roof.

The lined cavities can also be characterized by the fact that they include reinforcing members which extend in a direction parallel to the longitudinal axis of the cavity, the reinforcing members being attached to the vertical deformed members.

Preferably, the horizontal members or girders are also iron sections arranged, for example, to form a more or less regular grid with the transverse sections distorted to conform to the curvature of the walls of the cavity.

This embodiment provides the advantageous possibility of simultaneously applying more transverse sections interconnected with more longitudinal sections.

In a preferred embodiment the members of the skeleton structure are characterized by the fact that the members which are resistant to elastic deformation or distortion are introduced, distorted and restrained while they are arranged in contact with the impermeable flexible liner which covers the opposite sidewalls of the cavity of a rock cavern used as a tank for a fluid, e.g., a liquid.

In another embodiment of the invention, the supporting structure has a plurality of pairs of iron sections, each pair being contained in a section which is transverse to the longitudinal axis of the cavity, the sections in each pair having first ends attached to means of connecting the pairs to parts of the wall defining the cavity, each pair of sections also having a cross-piece, adjustable in length, with the ends connected to parts of the two sections contained between the ends, the length of the cross-pieces being regulated to apply forces able to deform the sections elastically and to place them in contact with the sidewalls of the cavity.

Preferably, the fasteners for fastening the pairs of sections to the walls of the cavity have a supporting component with two side channels symmetrically arranged in relation to a median vertical plane, the channels being designed to accommodate appropriate pins connected to the first ends of the sections, the pins being arranged parallel to the longitudinal axis of the cavity, the support members being attached to an appropriate structure connected to the impermeable flexible liner and the corresponding wall of the cavity.

The invention also provides a method for making the walls of a cavity in the earth impermeable which involves the following steps:

(a) covering the walls of the cavity with an impermeable flexible sheet of rubberized fabric or the like, (b) installing a plurality of spaced vertical structural members along transverse sections of the cavity in contact with the internal surface of the impermeable flexible liner and disposed between two opposite side walls, and attaching the structural members to the walls of the cavity.

In this description, the term "excavation" means any cavity in the earth having a wall of rock or cement or earth or other material for storing fluids particularly liquids, or for storing solid substances, or parts of solid substances, suspended in a fluid mass, or inside which fluid substances, or even transport media of any type, are to pass.

This cavity can have any cross-section, e.g. a U, semispherical or cylindrical cross-section, even with a considerable radius and lengths which can range from a few meters to several kilometers.

Referring now to FIG. 1 of the drawing, a cavern 1 in rock 2, adapted to be used as a tank for fluids, e.g., drinking water, having a cavity 3 enclosed by sidewalls 4 and 5, a dome shape roof 6 and a bottom wall or floor 7 is illustrated.

The cavern may extend on a substantially horizontal course for a substantial length of say 90 meters, with a height of 20 meters and a maximum transverse dimension of 10 meters.

Internally, the walls of cavern 1 is lined with an impermeable, flexible liner 8, made of a rubberized fabric or a similar material which is suitable for retaining the liquid without any loss into the rock and which protects the liquid against contamination by foreign substances which infiltrate through the rock in the direction of the cavity 3.

Cavern 1 has a skeleton structure 9 for fastening the impermeable flexible liner 8 to the walls of cavity 3. Supporting structure 9 has sections 10 made from members which resist elastic deformation and arranged at intervals along planes transverse to the longitudinal axis of the cavity between the opposite sidewalls 4 and 5, the members being in contact with the impermeable flexible lining and attached to parts of the roof of the cavity.

In a preferred embodiment, additional sections 11 are provided in a longitudinal direction, which cross the transverse sections 10 and are attached to them in such a way that they produce a unitary, strong structure which is substantially a grid.

This resistant structure can be elastically deformed and uniformly supports the impermeable, flexible liner without any point of support on the floor.

Consequently, the internal space in the cavern may be utilized completely for the storage of liquid.

Figure 2:
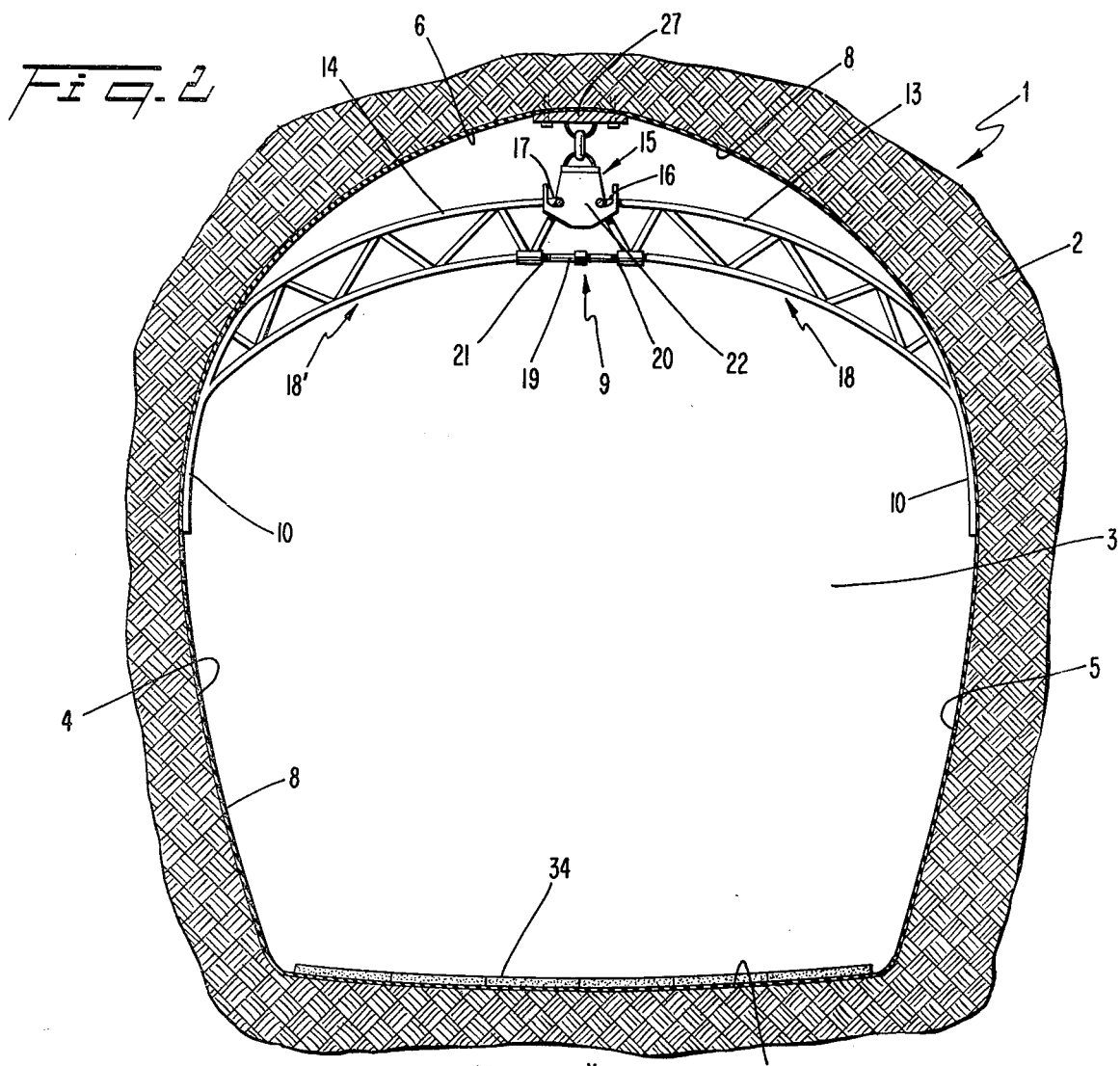
FIG. 2 is a cross-section of the embodiment of FIG. 1.

In another embodiment of the invention, referred to in particular in connection with the assembly steps hereinafter, the means 9 of locking the impermeable lining (FIG. 2) has a pair of two separate sections 13 and 14 and connecting devices 15 (FIG. 2, 3) suitable for connecting either sections 13 or 14 by their first ends 16 and 17, or the pair of sections to the roof 6 of the cavern. As an alternative, each pair may have sections or groups of sections, or trusses of various types in a transverse section; for example, the upper parts of transverse sections 13 and 14 are connected to similar components as shown in FIG. 2 in such a way as to create two strong structures, 18, 18' in the form of a triangular grid extending along a section transverse of the longitudinal axis of the cavern.

These triangular grid type structures have the advantage of being both strong and light, at the same time.

A suitable cross-piece 19, the length of which may be adjusted in a known manner, is arranged with its ends 20, 21, connected to the two strong structures 18, 18'. In practice, the connecting means 15 and the cross-piece 19 have the function of linking together the two strong structures 18, 18', which are initially separate in order to make assembly easy. Therefore, whereas after complete assembly, as can be seen from FIG. 2, the two strong structures 18 and 18' form a strong, single, compact unit which is elastically deformable and which behaves in a manner similar to a single transverse section 10 as illustrated in FIG. 1.

Preferably, the connecting members 15 (FIG. 3) consist of a supporting component 22, substantially anchor shaped, provided with two lateral channels 23, 24, symmetrically arranged in relation to a vertical median plane X—X. These channels are of a shape which is suitable for accommodating pins 25, 26 which are attached to the first ends 16, 17 of the transverse sections 13, 14 and which are arranged in a direction parallel to the longitudinal axis of the cavity.

The supporting element 22 (FIG. 3) is connected to a structure 27 having a plate 28 arranged so that it is in contact with the inside of the flexible liner at the center; plate 28 is attached in turn to the roof 6 by means of suitable bolts 29, 30. This supporting member 22 and plate 28 may be connected to each other by means of two semi-rings 31, 32, engaging in a spring loaded catch 33. The cavern 1 now described also has further means for equalizing the pressure inside and outside the impermeable layer. These means, for example, valves of a known type (for reasons of simplicity not illustrated here) are connected to the flexible, impermeable liner and permit the venting of the reservoir and prevent the impermeable layer from being subjected to atmospheric pressure outside and to a reduced pressure inside, as a result of which it could either become detached from those parts of the walls not supported by structural members, or it might tear.

Figure 3:
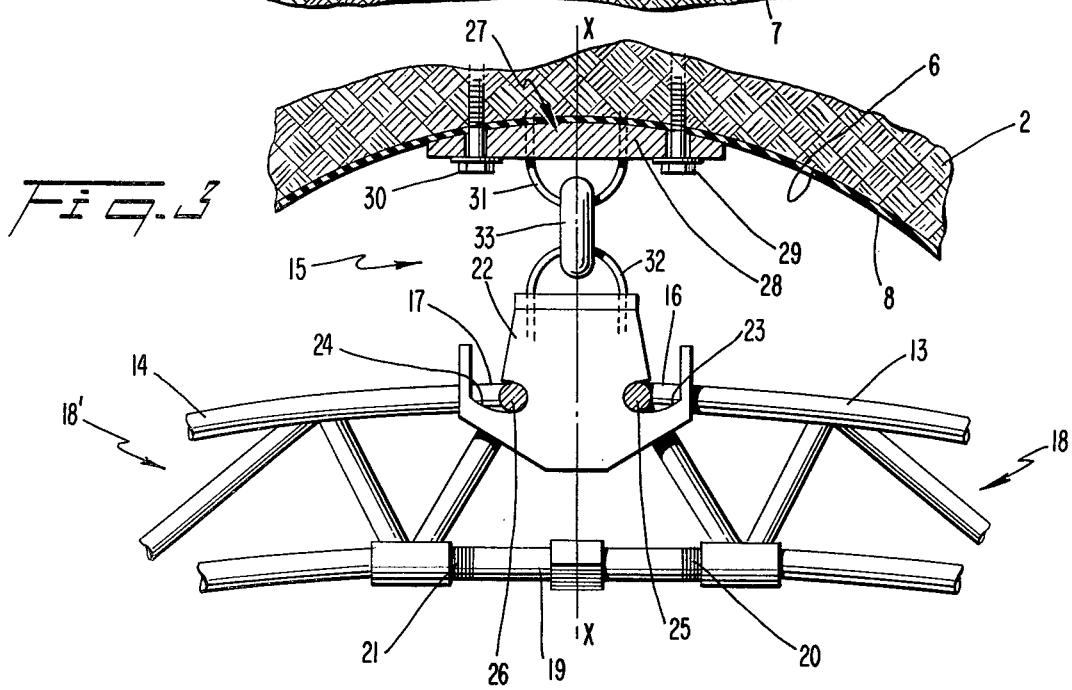
FIG. 3 is an enlarged view of an embodiment of a device for attaching the supporting structure of FIG. 2 to the walls of the cavity.

Having described the cavern 1 with the parts of it which determine its function as a reservoir, we shall now describe the method of assembly of these parts, for example by reference to the method of sealing the wall of the cavern as illustrated in FIGS. 2 and 3.

The method of assembly is divided into the following stages:

(a) first, a flexible impermeable lining 8, forming a single, sealed envelope is introduced inside the cavity 3, the external surface dimensions of which correspond to the internal (surface) dimensions of the cavity, i.e., the floor 7, the roof 6, the sidewalls 4 and 5 linking the roof 6, the transverse inlet sections and the wall at the back of the cavern.

(b) fluid pressure is then applied to the interior of the sealed envelope forming the impermeable flexible liner, until the same is inflated and in contact with the internal surface of the cavity.

This stage may be achieved in various ways.

For example, the envelope is inflated by pumping low pressure air into it, when at the same time, the impermeable flexible layer is lifted with the aid of a special tension bar passing through semi-rings (not illustrated) connected to the upper central portion of the impermeable lining; the ends of the tension bar are then operated, for example, through special holes made in the rock.

The floor 7 of the cavern is then gradually covered with bricks 34 and, using a special frame, the plate 28 is firmly connected to the central section of the flexible lining and to the roof 6.

In a later stage, the strong structures 18, 18', are assembled as follows: the pins 25, 26 of transverse sections 13 and 14 are introduced into channels 23, 24 of supporting member 22 and this supporting member is lifted with the two strong structures 18, 18' towards the roof 6.

In a subsequent stage, the supporting member 22 is connected to the fixed plate 28 by means of the spring catch 33.

Finally, the length of the cross-piece 19 is adjusted in order to apply loads which, by elastically deforming the strong structures 18, 18', cause the transverse sections to follow the curvature of the opposite walls 4 and 5, over a good portion of their length.

The same assembly steps are then repeated along the cavern in those transverse sections where it is proposed to insert further transverse sections.

In a final stage, i.e. when the impermeable lining adheres to the surface of the cavity through the effect of the locking means and the weight of the bricks on the floor, or a similar heavy material such as concrete or iron sleepers, the low pressure air used to inflate the envelope is extracted.

The means of locking the impermeable layer in accordance with the invention have the advantage that they lead to an elastic application of the impermeable flexible liner to the walls.

This elastic condition avoids the formation of air pockets with high pressures between the layer and the walls.

In fact, if the pressure of the air pocket reaches a high value, the transverse sections described above deform elastically, and this leads to the flexible liner momentarily moving away from the wall with a consequent escape of air from the pocket towards special vents 35 (FIG. 1) provided in the rock.

A further advantage of the invention is derived from the particular application of the sections arranged along transverse planes of the cavity.

These sections are easily accessible in the event of maintenance and may be easily replaced individually in accordance with the description given with reference to FIGS. 2 and 3.

Although certain methods of implementing this invention have been illustrated and described, it is to be understood that variations can be made by someone skilled in the art without departing from the scope of the invention except as it may be limited by the claims.

For example, the sections can be installed in accordance with the invention in caverns which have a vertical axis. Also, the impermeable liner to the walls may be applied by means of an adhesive substance, instead of the technique of inflation first described, and then locking the impermeable lining in position by means of the sections referred to.

With particular reference to FIG. 1, the process of the invention includes the steps of introducing individual sections 10 which are longer than the maximum transverse dimension inside the cavity 3, with elastic deformation of their original shape and then allowing these sections to regain part of their elastic deformation and spring on to the impermeable flexible lining without needing to resort to the application of mechanical means of connecting to the roof 6.

In this case, the sections behave like a spring, first compressed and then allowed to expand up to a certain length.

This solution is advantageous because of the simplicity of assembly, for example for underground passages or tunnels with a transverse dimension of 2 or 3 meters maximum.

It is also conceivable for the invention to include certain other members or resistant structure as fiberglass sections, or in general members which are less deformable than those referred to. In such a case, the members help to support the weight or prevent movement of the impermeable liner in the cavity.

What is claimed is:

1. A water tight underground cavity structure comprising an underground cavity, a casing of flexible and impermeable material placed in direct contact with the walls of said cavity, a substantially bi-dimensioned resilient reticular member disposed within said casing and having a shape corresponding to at least a portion of the top surface of said cavity, said reticular member contacting with and pressing said casing against said cavity walls, and means for varying the conformation of said reticular member to the walls of said cavity.

2. The structure of claim 1, characterized by the fact that the said structural members are elastically deformed.

3. The structure of claim 2, characterized by the fact that the said structural members are elastically deformed by the force to which they are subject by the curvature of the opposite sidewalls of the cavity and that they, in turn, transmit to them forces which are equal and opposite to the first forces so as to retain the impermeable flexible casing against the walls of the cavity with continuity, the said further forces being suitable for the keeping of the said deformed structural members elastically attached to parts of the cavity.

4. The structure of claims 2 or 3 characterized by the fact that the said structural members consist of a plurality of iron or glass fiber sections arranged at intervals along planes transverse to the longitudinal axis of the cavity.

5. The structure of claim 4 characterized by the fact that the said structural members have a plurality of pairs of iron sections, each pair being included in a section transverse to the longitudinal axis of the cavity, the sections of each pair having first ends attached to means of connecting these pairs to parts of the wall defining the cavity, each pair of sections also having a cross-piece adjustable in length with the ends attached to parts of the two sections contained between the relative ends, the length of the said cross-piece being adjusted to apply forces capable of deforming the sections elastically and placing the sections in contact with the sidewalls of the cavity.

6. The structure of claim 5 characterized by the fact that the said means for connecting the pairs of sections to the walls of the cavity include a supporting member having two lateral channels symmetrically disposed in relation to a corresponding vertical median plane, the said channels being designed to accommodate special pins connected to the first ends of the sections, the said pins being arranged in parallel with the longitudinal axis of the cavity, the said supporting member being attached to a special structure connected to the impermeable, flexible casing and the corresponding wall of the cavity.

7. The structure of claim 6 characterized by the fact that the said structure includes a plate in contact with the inside of the flexible impermeable casing and connecting screws between the plate and the wall of the cavity, the said plate and the said supporting member being connected to each other by means of a spring loaded catch connected between special semi-rings of the plate and of the supporting member.

8. The structure of claim 1 characterized by the fact that it includes reinforcement means extending in a direction parallel to the longitudinal axis of the cavity and connected to the said structural members.

9. The structure of claim 8 characterized by the fact that the said reinforcement means are iron sections.

10. The structure of claim 1 characterized by the fact that the said structural members are inserted and arranged in contact with the flexible impermeable casing which lines two opposite side walls of the cavity of a rock cavern, used as a reservoir for a liquid.

11. The structure of claim 10 characterized by the fact that the said structural members are installed only on the upper portion of the side walls, close to the roof of the said cavern.

12. The structure of claim 11 characterized by the fact that it includes a concrete floor above the bottom of the flexible casing.

13. The structure of claim 1 characterized by the fact that it includes means for equalizing the pressure inside and outside the impermeable casing, said means of equalization being connected to the flexible impermeable casing in order to equalize the external and internal pressure when the fluid is removed from the cavity under depression.

14. The structure of claim 1 characterized by the fact that it includes means for pulling and lifting the impermeable flexible casing, said means being arranged on external portions of the impermeable flexible casing.

15. The structure of claim 14 wherein the said means of lifting the casing consists of rings adapted for accepting draw bars operated from the roof of the cavity.

16. An excavation comprising a cavity in the earth having its walls covered with a fluid impervious flexible sheet-like liner and means for pressing the liner against the walls to secure it in place comprising a resilient skeleton structure comprising spaced vertical elongated structural members sprung into a curved contour against said liner whereby said members exert a pressure as they attempt to return to their normal straight condition pressing said liner against the wall, and spaced horizontal elongated structural members crossing said vertical members and forming therewith a lattice type skeleton supporting structure.

17. An article of manufacture comprising an excavation having walls surrounding a cavity formed in the earth, a sheet of fluid impermeable material lining said walls and preventing flow of fluid into or out of the cavity, and means supporting and pressing said lining material against the walls comprising spaced struts and girders combining to form a grid-like resilient skeleton structure with said struts distorted into a contour in which they are under tension and exert a pressure against the sheet.

18. The structure of claim 1, wherein said reticular member comprises structural resistant members in contact with the internal surface of said casing.

19. The structure of claim 18, wherein said structural members are sprung into a curved contour against said casing whereby said structural members exert a pressure as they attempt to return to their normal straight condition pressing said casing against the walls of said cavity.

* * * * *